(12) United States Patent
Zhang et al.

(10) Patent No.: US 8,086,006 B2
(45) Date of Patent: Dec. 27, 2011

(54) METHOD AND SYSTEM FOR EVALUATING IMAGE SEGMENTATION BASED ON VISIBILITY

(75) Inventors: Wei Zhang, Plainsboro, NJ (US);
Adrian Barbu, Tallahassee, FL (US);
Simone Prummer, Neunkirchen am Brand (DE); Martin Ostermeier, Buckenhof (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 742 days.

(21) Appl. No.: 12/231,634

(22) Filed: Sep. 4, 2008

(65) Prior Publication Data
US 2009/0080729 A1 Mar. 26, 2009

Related U.S. Application Data

(60) Provisional application No. 60/974,099, filed on Sep. 21, 2007.

(51) Int. Cl.
*G06K 9/00* (2006.01)
(52) U.S. Cl. ........................................................ 382/128
(58) Field of Classification Search ................. 396/128; 382/128
See application file for complete search history.

(56) References Cited

U.S. PATENT DOCUMENTS

| | | | |
|---|---|---|---|
| 5,557,684 A | 9/1996 | Wang et al. | |
| 6,826,292 B1 | 11/2004 | Tao et al. | |
| 6,987,865 B1 | 1/2006 | Szeliski et al. | |
| 7,155,032 B2 | 12/2006 | Szeliski et al. | |
| 7,756,305 B2* | 7/2010 | Price | 382/128 |
| 7,936,922 B2* | 5/2011 | Berger | 382/173 |
| 2006/0110036 A1* | 5/2006 | Luo et al. | 382/170 |
| 2006/0285747 A1 | 12/2006 | Blake et al. | |
| 2007/0116356 A1 | 5/2007 | Gong et al. | |
| 2007/0165921 A1* | 7/2007 | Agam et al. | 382/128 |
| 2007/0165943 A1* | 7/2007 | Guetter et al. | 382/159 |
| 2008/0247621 A1* | 10/2008 | Zarkh et al. | 382/130 |
| 2009/0147919 A1* | 6/2009 | Goto et al. | 378/86 |

OTHER PUBLICATIONS

Zhang, A Survey on Evaluation Methods for Image Segmentation, Pattern Recognition, vol. 29, No. 8, pp. 1335-1346, 1996.*
Oron, et al., Precision Tracking with Segmentation for Imaging Sensors, IEEE Transactions on Aerospace and Electronic Systems, vol. 29, No. 3, Jul. 1993.*
Mezaris, et al., Still Image Objective Segmentation Evaluation using Ground Truth, 5th COST 276 Workshop (2003), pp. 9-14.*
Bouras, Visual Object Tracking Using Motion and Brightness, Dissertation, Department of Computer Science, University of Sheffield, Aug. 2004.*
A. Barbu, et al., "Hierarchical Learning of Curves Application to Guidewire Localization in Fluoroscopy", IEEE Int'l. Conf. on Computer Vision Pattern Rec., 2007.
T.F. Coleman, et al., "A Reflective Newton Method for Minimizing a Quadractic Function Subject to Bounds on some of the Variables", SIAM Journal on Opt., vol. 6, No. 4, 1996.
Z. Tu, "Probabilistic Boosting-Tree: Learning Discriminative Models for Classification, Recognition, and Clustering" IEEE Int'l Conf. on Computer Vision, 2006.

\* cited by examiner

*Primary Examiner* — Rodney Fuller

(57) ABSTRACT

A method and system for evaluating image segmentation is disclosed. In order to quantitatively evaluate an image segmentation technique, synthetic image data is generated and the synthetic image data is segmented to extract an object using the segmentation technique. This segmentation results in a foreground containing the extracted object and a background. The visibility of the extracted object is quantitatively measured based on the intensity distributions of the segmented foreground and background. The visibility is quantitatively measured by calculating the Jeffries-Matusita distance between the foreground and background intensity distributions. This method can be used to evaluate segmentation of vessels in fluoroscopic image sequences by coronary digital subtraction angiography (DSA).

23 Claims, 14 Drawing Sheets

802

804

806

808

_US 8,086,006 B2_

METHOD AND SYSTEM FOR EVALUATING IMAGE SEGMENTATION BASED ON VISIBILITY

This application claims the benefit of U.S. Provisional Application No. 60/974,099, filed Sep. 21, 2007, the disclosure of which is herein incorporated by reference.

BACKGROUND OF THE INVENTION

The present invention relates to object segmentation in medical images, and more particularly to evaluating image segmentation based on visibility.

Angiography is a medical imaging technique in which X-ray images are used to visualize internal blood filled structures, such as arteries, veins, and the heart chambers. Since blood has the same radiodensity as the surrounding tissues, these blood filled structures cannot be differentiated from the surrounding tissue using conventional radiology. Thus, in angiography, a contrast agent is added to the blood, usually via a catheter, to make the blood vessels visible via X-ray. In many angiography procedures, X-ray images are taken over a period of time, which results in a sequence of fluoroscopic images, which show the motion of the blood over the period of time. Such fluoroscopic image sequences contain useful information that can be difficult to decipher due to the collapsing of 3-dimensional information into the 2-dimensional images.

Since different objects in a fluoroscopic image sequence have different patterns of motion, objects can be extracted from a fluoroscopic image sequence in layers based on motion patterns found in the fluoroscopic image sequence. Coronary digital subtraction angiography (DSA) is a method for segmenting vessels in the heart by extracting motion-based layers from fluoroscopic image sequences of the heart. Coronary DSA separates the vessels from background in the fluoroscopic images, such that the segmented vessels are highly visible. Although human perception can be used to see that the visibility of the segmented vessels has increased, there is no quantitative measurement of visibility that can be used to evaluate segmentation techniques.

BRIEF SUMMARY OF THE INVENTION

The present invention provides a method and system for evaluating image segmentation based on visibility. Embodiments of the present invention utilize a quantitative measurement of visibility that is consistent with human perception. Furthermore, embodiments of the present invention can be used to evaluate image segmentation techniques for images with various levels of noise.

In one embodiment of the present invention, synthetic image data is generated. The synthetic image data can be generated by generating a ground truth image of an object to be segmented and combining the ground truth image with a background image. The synthetic image data is segmented to extract an object, resulting in a foreground containing the extracted object and a background. The visibility of the extracted object is quantitatively measured based on intensity distributions of the segmented foreground and background. The quantitative measure of visibility can be obtained by calculating the Jeffries-Matusita (JM) distance between the intensity distributions of the segmented foreground and background. The quantitative visibility measure of the extracted object can be compared to the quantitative visibility measure of the object in the synthetic image data.

In a particular embodiment of the present invention, segmentation of vessels in fluoroscopic image sequences by coronary digital subtraction angiography (DSA) is quantitatively evaluated based on visibility. A synthetic fluoroscopic image sequence can be generated by generating a sequence of ground truth images of vessels and summing the sequence of ground truth images with a sequence of background images in logarithm space. Coronary DSA can be used to segment vessels in the synthetic fluoroscopic image sequence by estimating motion fields of vessel branches between frames of the sequence, segmenting a vessel layer based on the motion fields, and normalizing the segmented vessel layer. The JM distance between the intensity distributions of the vessels and the background in the segmented vessel layer can then be calculated as a quantitative visibility measure of the segmented vessels.

These and other advantages of the invention will be apparent to those of ordinary skill in the art by reference to the following detailed description and the accompanying drawings.

DETAILED DESCRIPTION OF EXEMPLARY EMBODIMENTS

The present invention is directed to a method for evaluating image segmentation based on visibility. Although embodiments of the present invention described herein are directed toward evaluating segmentation of fluoroscopic images, the present invention is not limited thereto, and may be similarly applied to segmentation of other types of images, such as computed tomography (CT), magnetic resonance (MR), and ultrasound images. Embodiments of the present invention are described herein to give a visual understanding of segmentation evaluation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
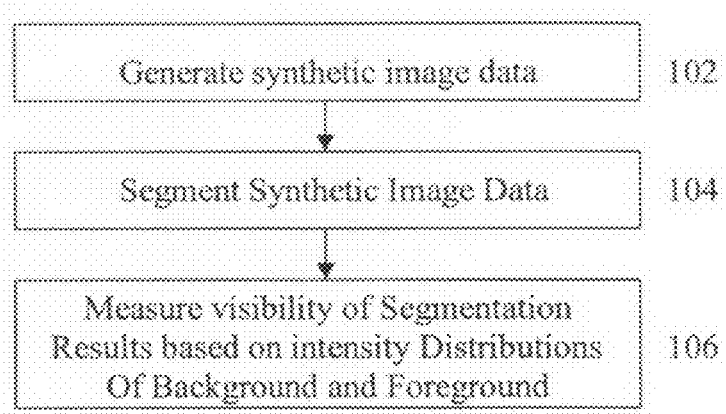
FIG. 1 illustrates a method for evaluating image segmentation according to an embodiment of the present invention.

FIG. 1 illustrates a method for evaluating image segmentation according to an embodiment of the present invention. The method of FIG. 1 is described herein in the context of evaluating vessel segmentation in a fluoroscopic image sequence using coronary digital subtraction angiography (DSA). It is to be understood that the method of FIG. 1 can be similarly applied to evaluate segmentation of various objects in various types of images using various image segmentation techniques.

At step 102, synthetic image data is generated. In order to generate the synthetic image data, ground truth images of an object to be segmented are obtained, and the ground truth images are combined with background images, resulting in synthetic images having a known foreground (ground truth object) and background. It is also possible to add varying levels of noise and contrast to the synthetic image data in order to test robustness of an image segmentation technique to varying levels of noise and contrast.

Figure 2:
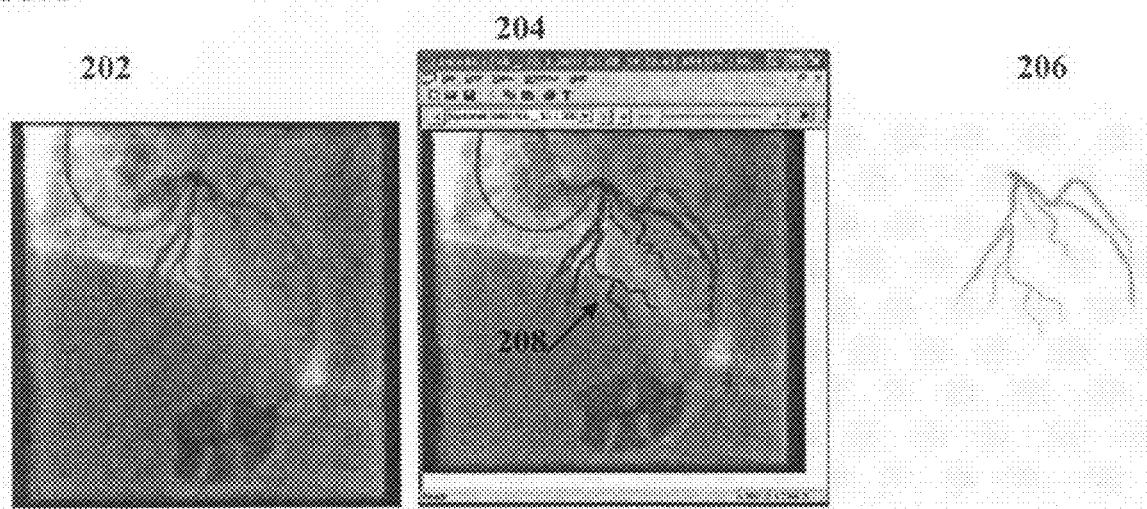
FIG. 2 illustrates an exemplary ground truth image obtained based on human annotation.

The ground truth images can be obtained based on human annotation. FIG. 2 illustrates an exemplary ground truth image obtained based on human annotation. As illustrated in FIG. 2, image 202 is an x-ray (fluoroscopic) image obtained in a coronary angiography procedure. Image 204 shows vessels 208 annotated by human annotation, and image 206 is the ground truth image of the vessels based on the annotated vessels 208 in image 204.

Figure 3:
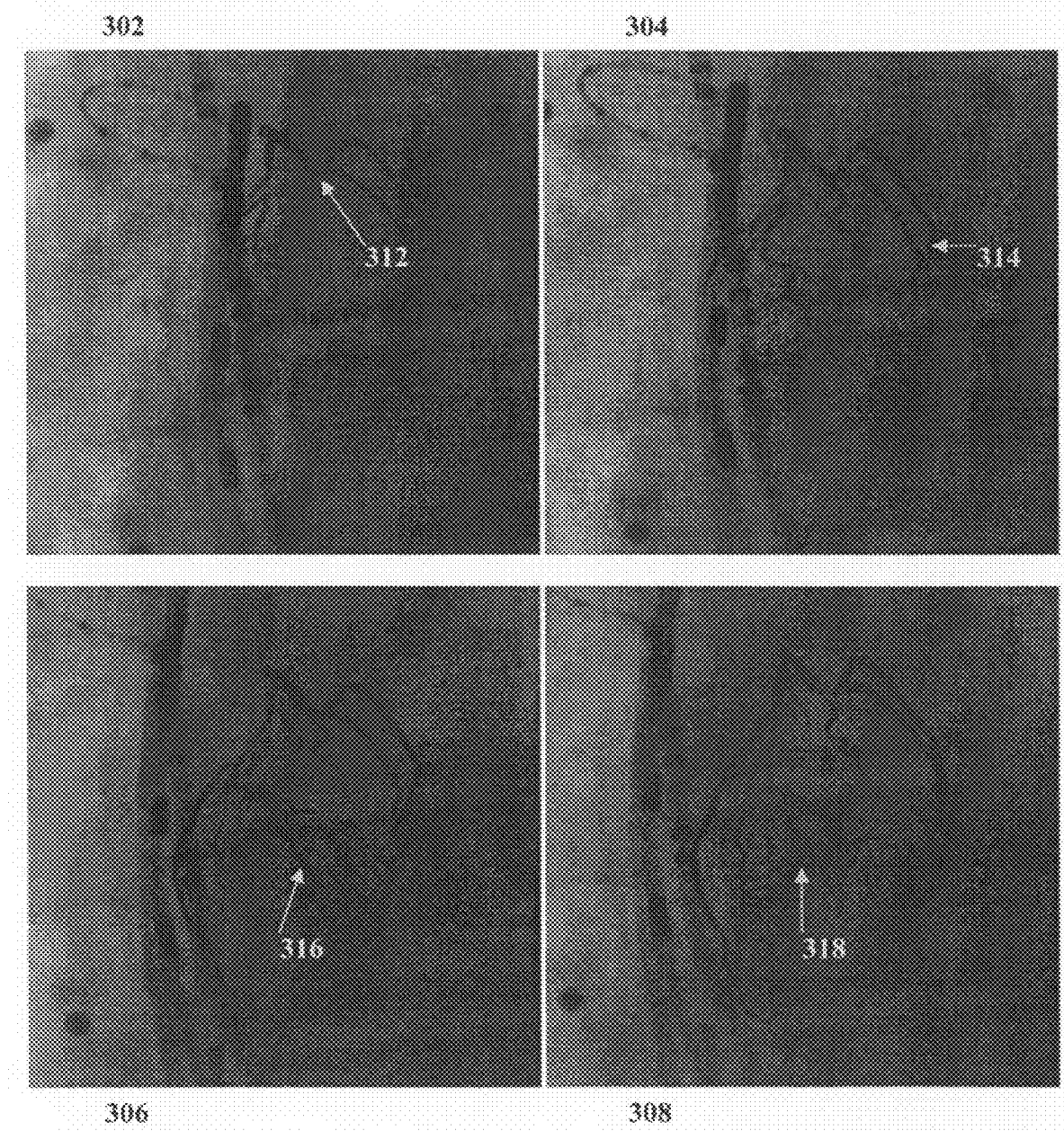
FIG. 3 illustrates exemplary synthetic images of a synthetic x-ray image sequence.

In order to generate a synthetic fluoroscopic image sequence for evaluating the coronary DSA method, a sequence of ground truth images are obtained as shown in FIG. 2. The ground truth images are summed with another sequence of x-ray images (background images) in the logarithm space to simulate the composition of x-ray images, thus resulting in the synthetic sequence. FIG. 3 illustrates exemplary synthetic images of a synthetic x-ray image sequence. As illustrated in FIG. 3 images 302, 304, 306, and 308 are synthetic x-ray images or frames of a synthetic x-ray image sequence. Each of the synthetic images 302, 304, 306, and 308 is generated by combining a respective ground truth image 312, 314, 316, and 318, respectively, with a respective background x-ray image, as described above. The ground truth images 312, 314, 316, and 318 are vessels obtained based on human annotation in an angiography image. As shown in images 302, 304, 306, and 308, the vessel is growing and the background is moving as well (to the upper left). In order to make the synthetic images 302, 304, 306, and 308 close to real images, the vessel area in each ground truth image 312, 314, 316, and 318 is copied from the original angiography image, and therefore, is not homogenous. The standard deviation of the sequence intensity is 8.13 for the synthetic sequence of FIG. 3, and the non-vessel area is homogeneously transparent (with intensity value 255).

Figure 4:
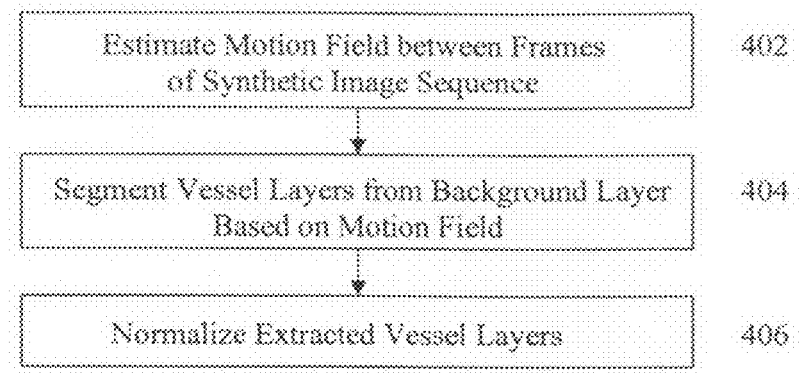
FIG. 4 illustrates a method of segmenting vessels in a synthetic x-ray sequence using coronary DSA according to an embodiment of the present invention.

Returning to FIG. 1, at step 104, the synthetic image data is segmented. The synthetic image data is segmented using a segmentation technique to be evaluated. The segmentation of the synthetic data results in segmentation results of an extracted object, or foreground, and a background. For example, vessels can be segmented from a synthetic x-ray sequence using coronary DSA. FIG. 4 illustrates a method of segmenting vessels in a synthetic x-ray sequence using coronary DSA according to an embodiment of the present invention. It is to be understood that FIG. 4 is an exemplary method for implementing step 104 of FIG. 1, and other segmentation techniques may be used.

Figure 5:
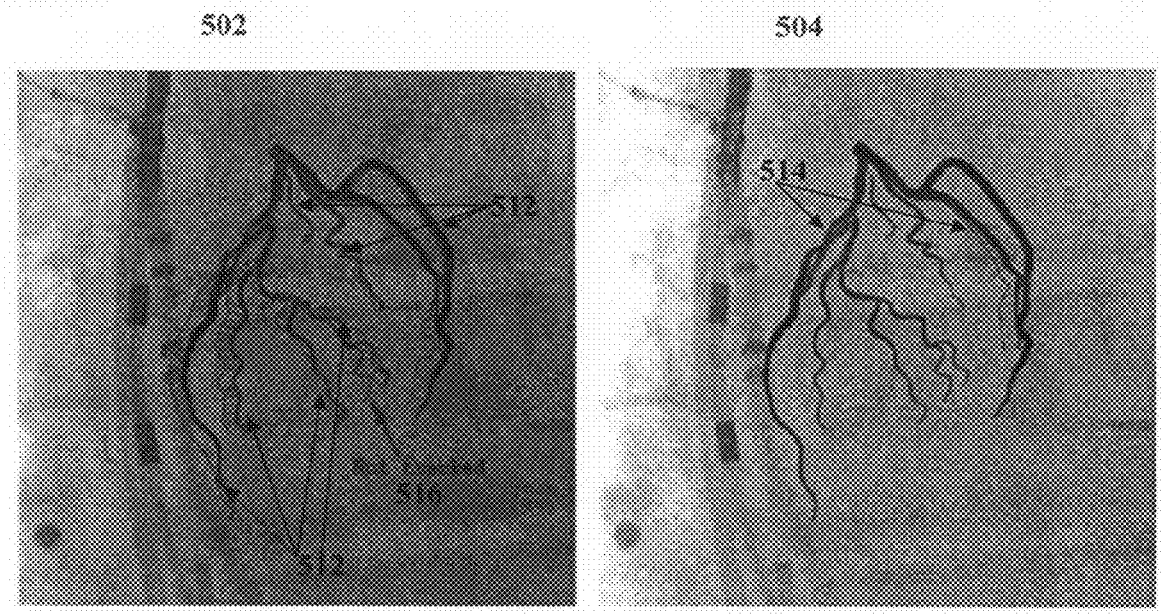
FIG. 5 illustrates motion field estimation for vessel branches divided into two sets.

At step 402, motion fields are estimated between frames of the synthetic image sequence. The motion fields can be estimated based on annotations. Portions of the vessel branches are detected and point-to-point matches between the vessel branches are obtained between two images (frames) in the synthetic image sequence. A thin plate spline is then used to generate the motion field for the vessel between the images. In practice, some vessel branches may overlap in the images and their topological relationship may not hold between the frames. This problem can be solved by separating the vessel branches into two disjunct sets so that there is no overlapping branch in each set, and separately tracking the motion in the branches in each set. FIG. 5 illustrates motion field estimation for vessel branches divided into two sets. As illustrated in FIG. 5, images 510 and 520 shows vessel branches divided into a first set of branches 512 and second set of branches 522. Image 510 shows motion fields estimated for branches 512, and image 520 shows motion fields estimated for branches 522. It is also possible to take into account the fact that some small branches may be too small for the motion to be detected. For example, branch 514 in FIG. 5 is not tracked. Because the motion of vessel branches is mainly due to the heartbeat, the motion of small branches is correlated to the motion of major branches, while uncorrelated to the motion of the background. As a result, the motion of the small branches can still be recovered based on the motion field generated for the major branches. In addition to the motion field for the vessels, a motion field for the background is also obtained assuming the background is static.

Figure 6:
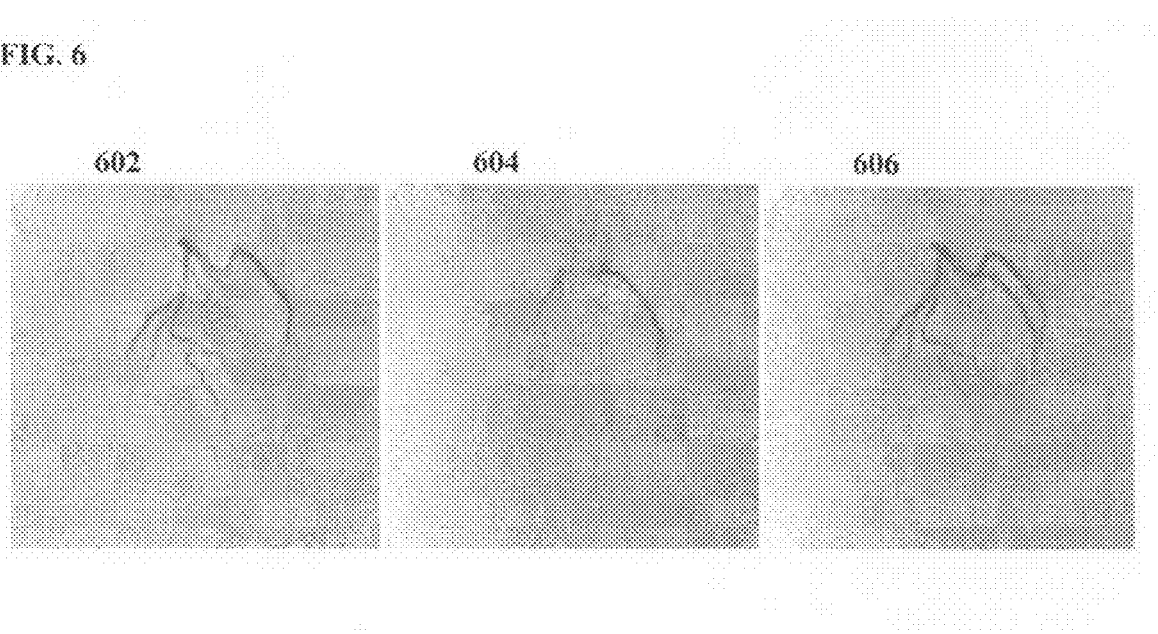
FIG. 6 illustrates exemplary vessel layer segmentation results.

Returning to FIG. 4, at step 404, a vessel layer is segmented from a background layer of the synthetic images based on the motion fields. The vessel layer is segmented from the background layer by separating portions having similar motion in each image of the synthetic image sequence. When the vessel branches are divided into separate sets of branches, a separate layer can be extracted for each set of branches. For example, if the vessels are separated into two sets of branches, three layers are estimated from each synthetic image, corresponding to two vessel layers (one for each set of branches) and a background layer. The two vessel layers are then combined to generate the final vessel segmentation result. FIG. 6 illustrates exemplary vessel layer segmentation results. As illustrated in FIG. 6, image 602 is a first vessel layer corresponding to the first set of branches 512 of FIG. 5, and image 604 is a second vessel layer corresponding to the second set of branches 514 of FIG. 5. Image 606 is the vessel segmentation result generated by summing images 602 and 604 in the logarithm space.

Figure 7:
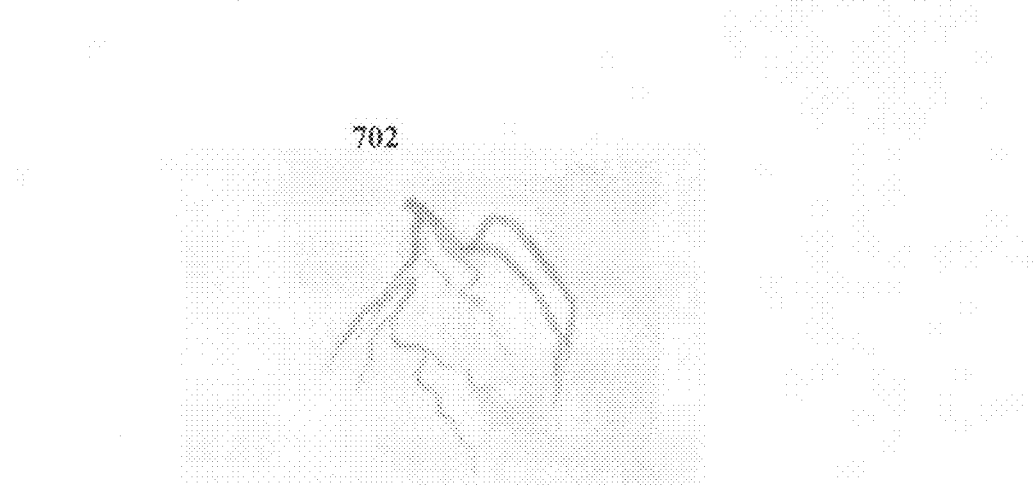
FIG. 7 illustrates exemplary normalized vessel segmentation results.

Returning to FIG. 4, at step 406 the extracted vessel layer is normalized. The vessel layer segmented at step 404 may not be the same as the ground truth. One reason is that coronary DSA recovers the contrast, but not exact intensity values. This is because a contrast can be subtracted from the vessel layer and added to the background layer without changing the sum of the layers. As a result, the intensity can change dramatically between frames of the extracted vessel layers. In order to normalize the vessel layer, it can be assumed that the vessel layer only contains vessel structures, i.e., most of the area of the layer is transparent. Therefore, the constant difference between the extract segmentation result and the ground truth can be estimated. The value that minimizes the sum of square differences is the mean of differences. By adding the constant value to the extracted layer, the segmented vessel layer can be normalized so that it is closest to the ground truth in the least squares sense. FIG. 7 illustrates exemplary normalized vessel segmentation results. As illustrated in FIG. 7, image 702 shows the result of normalizing the vessel segmentation result 606 of FIG. 6.

Returning to FIG. 1, at step 106, the visibility of the segmentation results for the synthetic image data is measured based on intensity distributions of the background and foreground. The segmented object (foreground) is compared with the ground truth is order to quantitatively assess the visibility of the segmentation results. Mean Square Error (MSE) and Signal to Noise ration (SNR) can be used to evaluate the accuracy of the segmentation, but these measurements do not provide a measurement of visibility that is compliant with human perception. In order to quantitatively measure visibility of the segmented foreground, a measurement can be calculated based on the Jeffries-Matusita (JM) distance, which measures the separability between classes. In particular, the separation between the classes of the segmented foreground (e.g., segmented vessels) and the background is calculated by calculating the JM distance between the intensity distributions of the foreground and the background. This distance is defined as:

$$JM_{ij} = \int [\sqrt{p_i(x)} + \sqrt{p_j(x)}]^2 dx$$

where i and j represent the foreground and background, respectively, and $p_i(x)$ and $p_j(x)$ are the intensity distributions of the foreground and background, respectively.

In a special case where the two classes can be modeled as Gaussian distributions, the JM distance becomes:

$$JM_{ij}^G = 2(1 - e^{-B_{ij}})$$

where $$B_{ij} = \frac{1}{8}(\mu_i - \mu_j)^T \left\{ \frac{\Sigma_i + \Sigma_j}{2} \right\}^{-1} (\mu_i - \mu_j) + \frac{1}{2} \ln \left\{ \frac{\left| \frac{(\Sigma_i + \Sigma_j)}{2} \right|}{|\Sigma_i|^{1/2} |\Sigma_j|^{1/2}} \right\}.$$

$\Sigma_j$ is the covariance of class j and $\mu_j$ is the mean of class j. $B_{ij}$ is the Bhattacharyya distance between the two classes. A benefit of using the JM distance to measure visibility is that it is bounded with a range of [0,2]. When using the JM distance to measure visibility, since two classes are distributed in the 1D space of intensity, the covariance of an intensity distribution simplifies to be the square of the standard deviation of the intensity distribution. Accordingly, the Bhattacharyya distance can be rewritten as:

$$B_{ij} = \frac{1}{4} \frac{(\mu_i - \mu_j)^2}{(\sigma_i^2 + \sigma_j^2 - \varepsilon)} + \frac{1}{2} \ln \frac{\sigma_i^2 + \sigma_j^2}{2\sigma_i \sigma_j},$$

where σ is the standard deviation of an intensity distribution. Note that there is a tuning term ε in the denominator that can be used to increase or decrease the importance of the contrast between foreground and background according to human perception. For example, the value of ε can be tuned based on the input of multiple observers. In an exemplary implementation, ε can be set to 100. Based on the above equations, the JM distance can be calculated as quantitative measure of the visibility of the segmentation results. The JM distance can be calculated for the original synthetic image data and for the segmented image data, and the JM distances can be compared to evaluate the segmentation procedure used to segment the image data. For example, the JM distance can be calculated for the segmentation results for each frame of a synthetic fluoroscopic image sequence segmented using coronary DSA.

Figure 8:
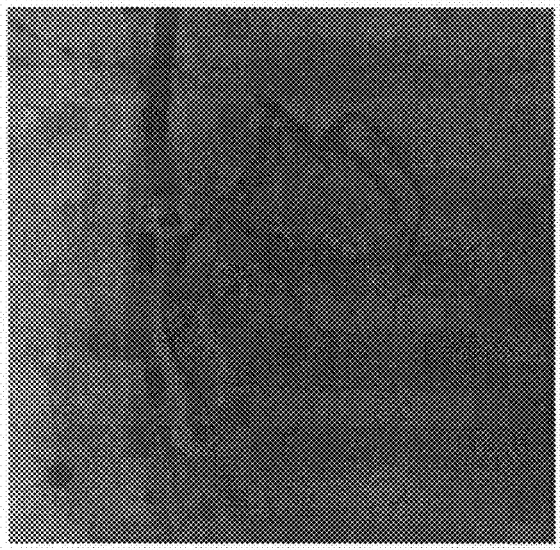
FIG. 8 illustrates a synthetic fluoroscopic image generated with different levels of noise.
Figure 8:
Figure 8:
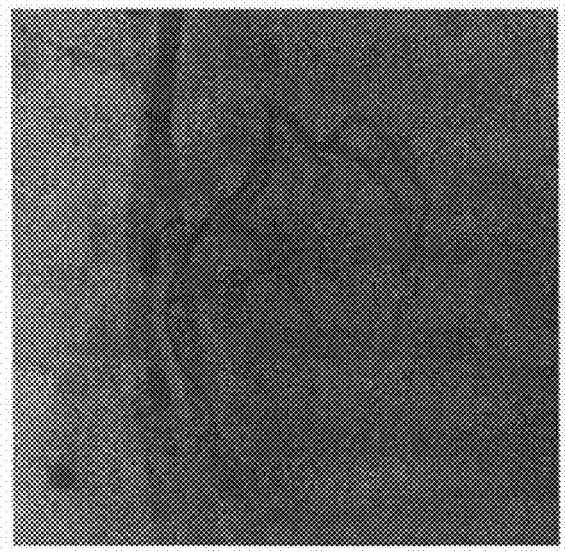
Figure 8:
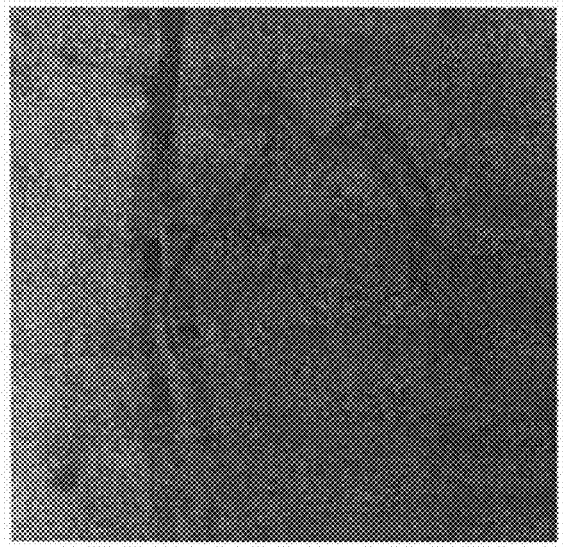
Figure 9:
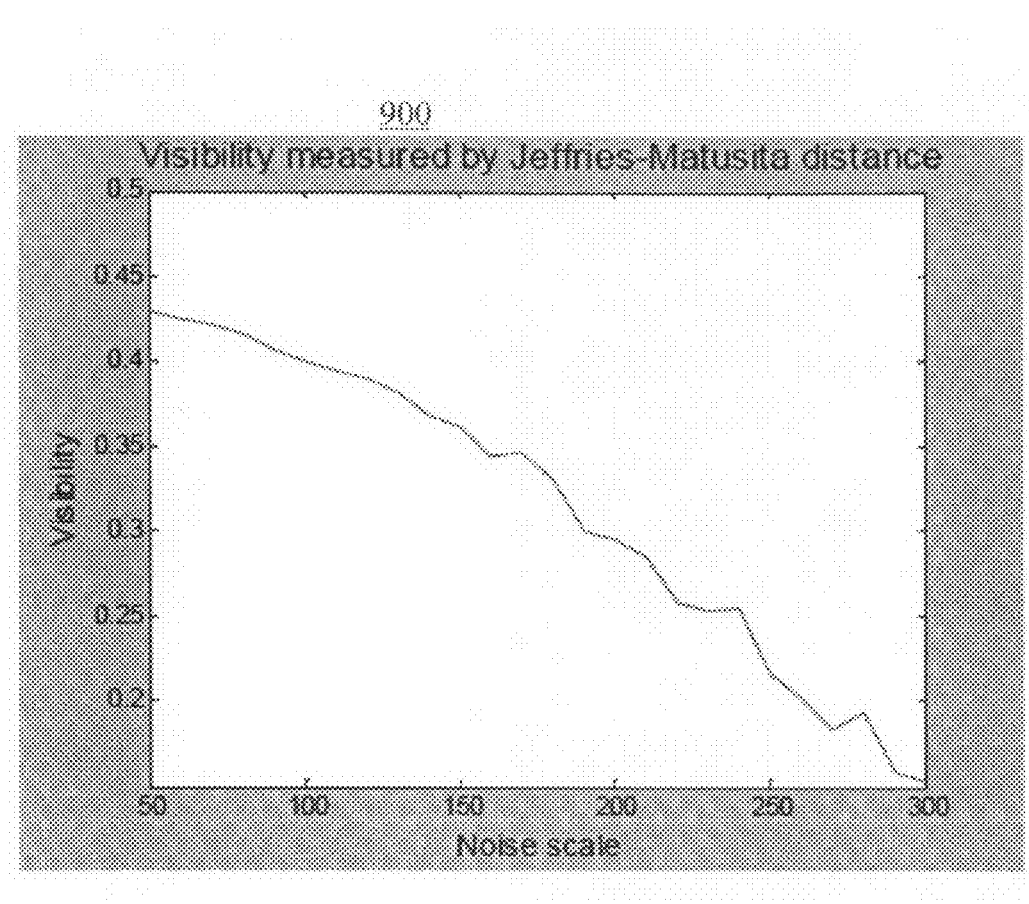
FIG. 9 illustrates visibility a function of the noise level of synthetic image data.

When generating the synthetic image data, it is possible to add varying levels of noise in order to test robustness of an image segmentation technique to varying levels of noise. The noise can be added by generating a uniformly distributed white noise image. The noise image can be blurred, for example, using a Gaussian filter of size 5. The generated noise image is then multiplied with different noise scales to simulate images with different levels of noise and added to the synthetic image data. FIG. 8 illustrates a synthetic fluoroscopic image generated with different levels of noise. As illustrated in FIG. 8, image 802 is an original synthetic fluoroscopic image with no noise added. Image 804 shows the synthetic fluoroscopic image 802 with moderate noise added (noise scale=120). Image 806 shows the synthetic image 802 with more noise added (noise scale=180). Image 808 shows the synthetic image 802 with severe noise added (noise scale=240). FIG. 9 illustrates visibility as a function of the noise level of the synthetic image data. As illustrated in FIG. 9, graph 900 shows that the visibility measured by the JM distance decreases as the noise scale increases, which is consistent with human perception.

Figure 10A:
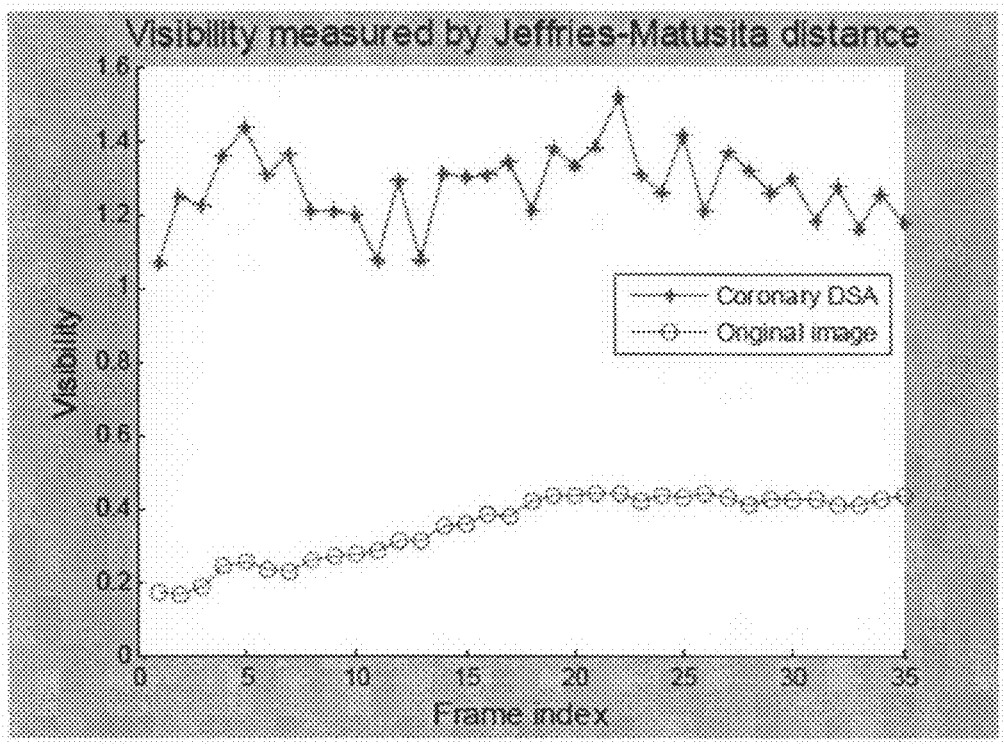
FIGS. 10A-10D illustrate visibility of vessels in a synthetic fluoroscopic image sequence compared to visibility of segmented vessels using coronary DSA for different noise levels.
Figure 10B:
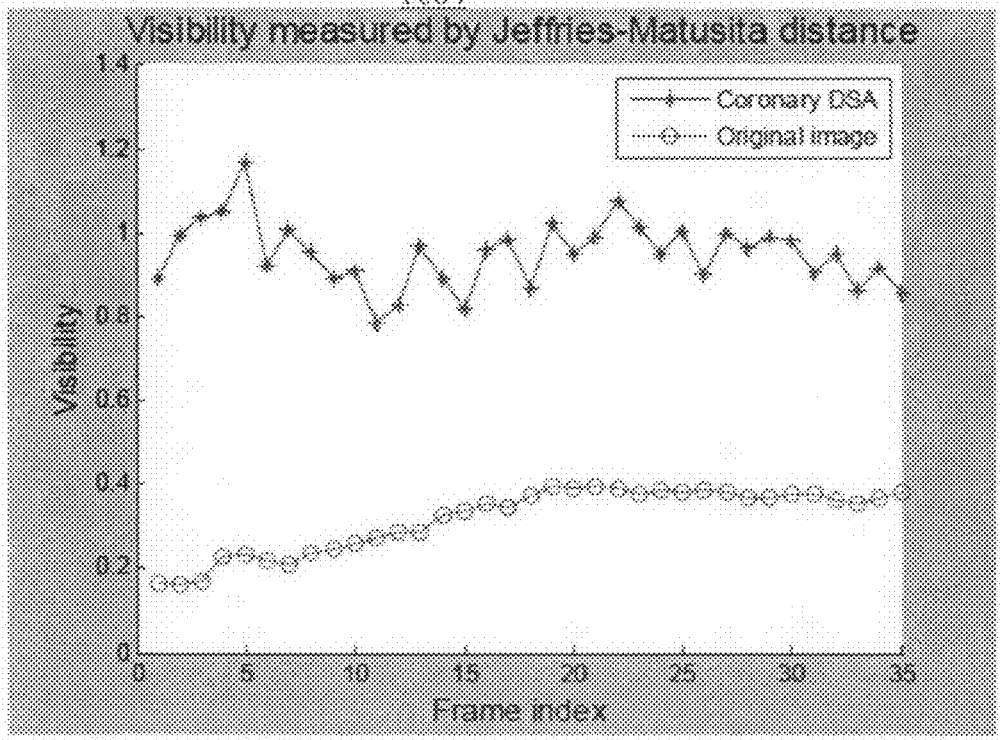
Figure 10C:
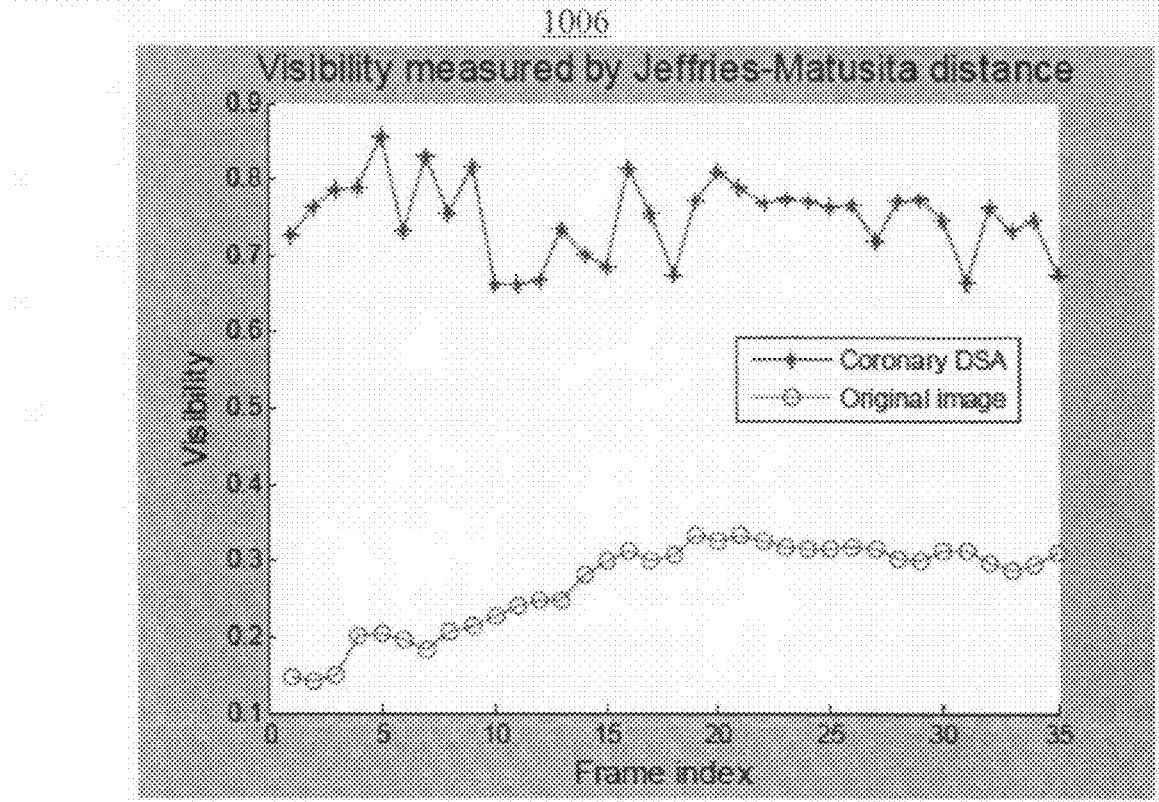
Figure 10D:
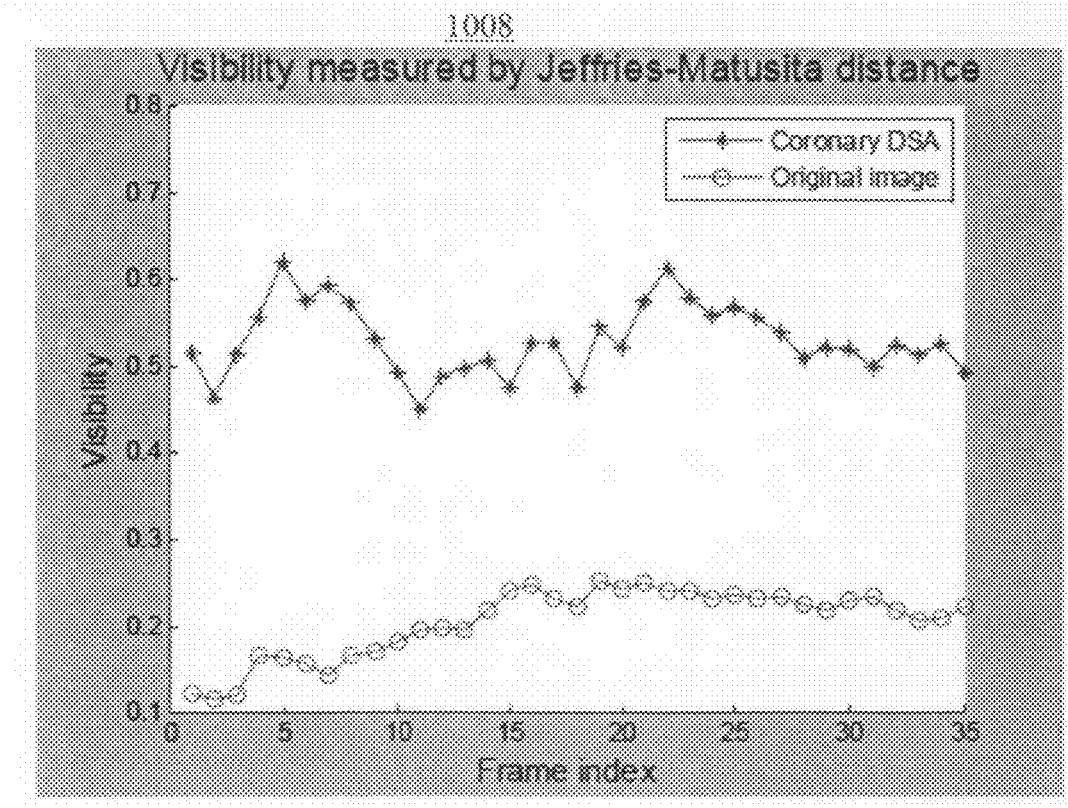

The visibility measured by JM distance can be used to compare the synthetic image data with the segmentation results to evaluate the segmentation technique used to segment the image data. FIGS. 10A-10D illustrate visibility of vessels in a synthetic fluoroscopic image sequence compared to visibility of the segmented vessels using coronary DSA for different noise levels. As illustrated in FIG. 10A, graph 1002 shows the visibility, measured by JM distance, of vessels in a synthetic fluoroscopic image sequence with no added noise and vessels segmented from the synthetic image sequence using coronary DSA. As illustrated in FIG. 10B, graph 1004 shows the visibility, measured by JM distance, of vessels in a synthetic fluoroscopic image sequence with moderate noise (noise scale=120) and vessels segmented from the synthetic image sequence using coronary DSA. As illustrated in FIG. 10C, graph 1006 shows the visibility, measured by JM distance, of vessels in a synthetic fluoroscopic image sequence with more noise (noise scale=180) and vessels segmented from the synthetic image sequence using coronary DSA. As illustrated in FIG. 10D, graph 1008 shows the visibility, measured by JM distance, of vessels in a synthetic fluoroscopic image sequence with severe noise (noise scale=240) and vessels segmented from the synthetic image sequence using coronary DSA.

Figure 11:
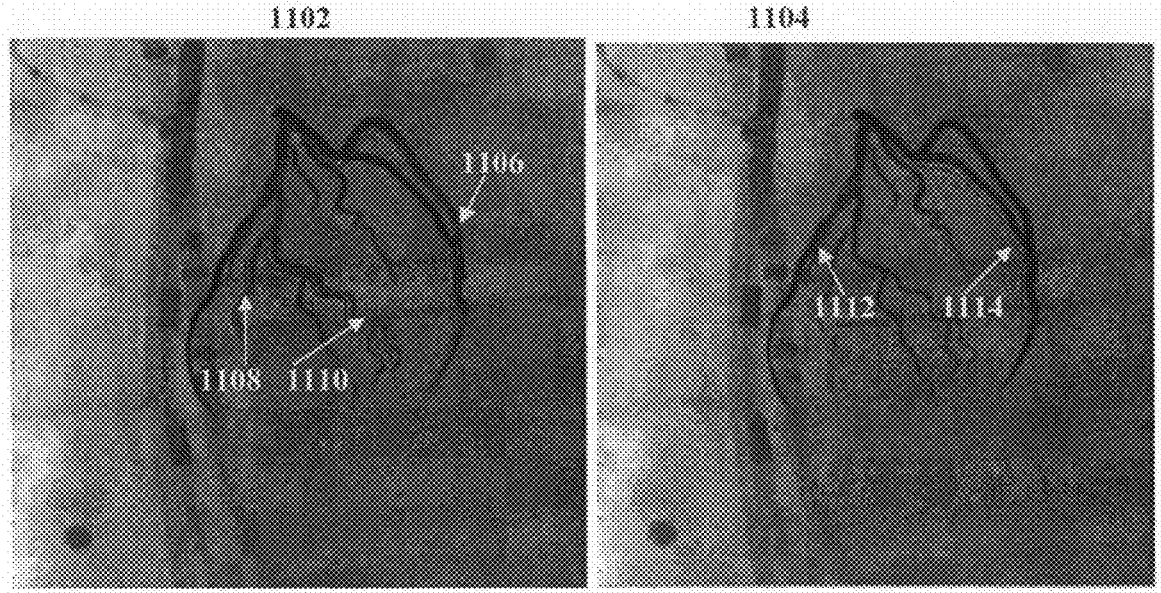
FIG. 11 illustrates estimating a motion field by tracking only five vessel branches.
Figure 12:
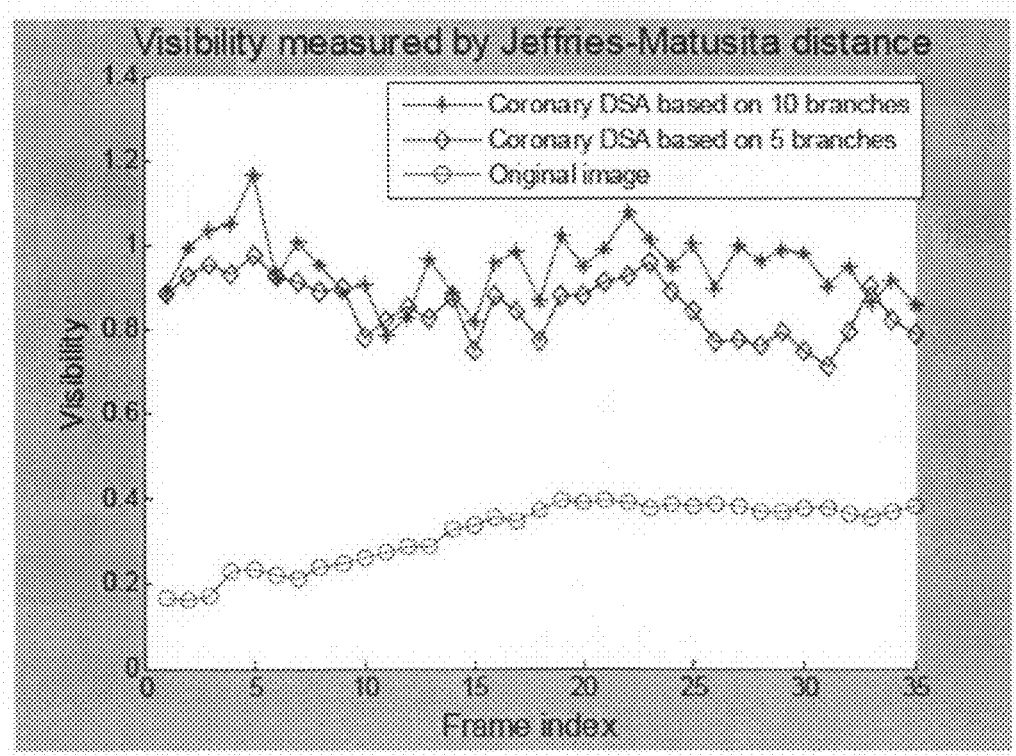
FIG. 12 illustrates visibility of vessels segmented using coronary DSA based on five branches compared to vessels segmented using coronary DSA based on ten branches.

The visibility measured by JM distance can also be used to evaluate variations in an image segmentation technique. For example, the visibility measure can be used to evaluate coronary DSA when different numbers of branches are tracked for motion estimation. FIG. 11 illustrates estimating a motion field by tracking only five vessel branches. As illustrated in FIG. 11, only five branches 1106, 1108, 1110, 1112, and 1114 are tracked to estimate the motion field. The five branches 1106, 1108, 1110, 1112, and 1114 are tracked in two sets shown in images 1102 and 1104, respectively. FIG. 12 illustrates the visibility of vessels segmented using coronary DSA based on five branches compared to vessels segmented using coronary DSA based on ten branches. As illustrated in FIG. 12, graph 1200 shows the JM distance for vessels segmented using coronary DSA based on five and ten branches, as well as for vessels in the original synthetic image sequence.

Figure 13:
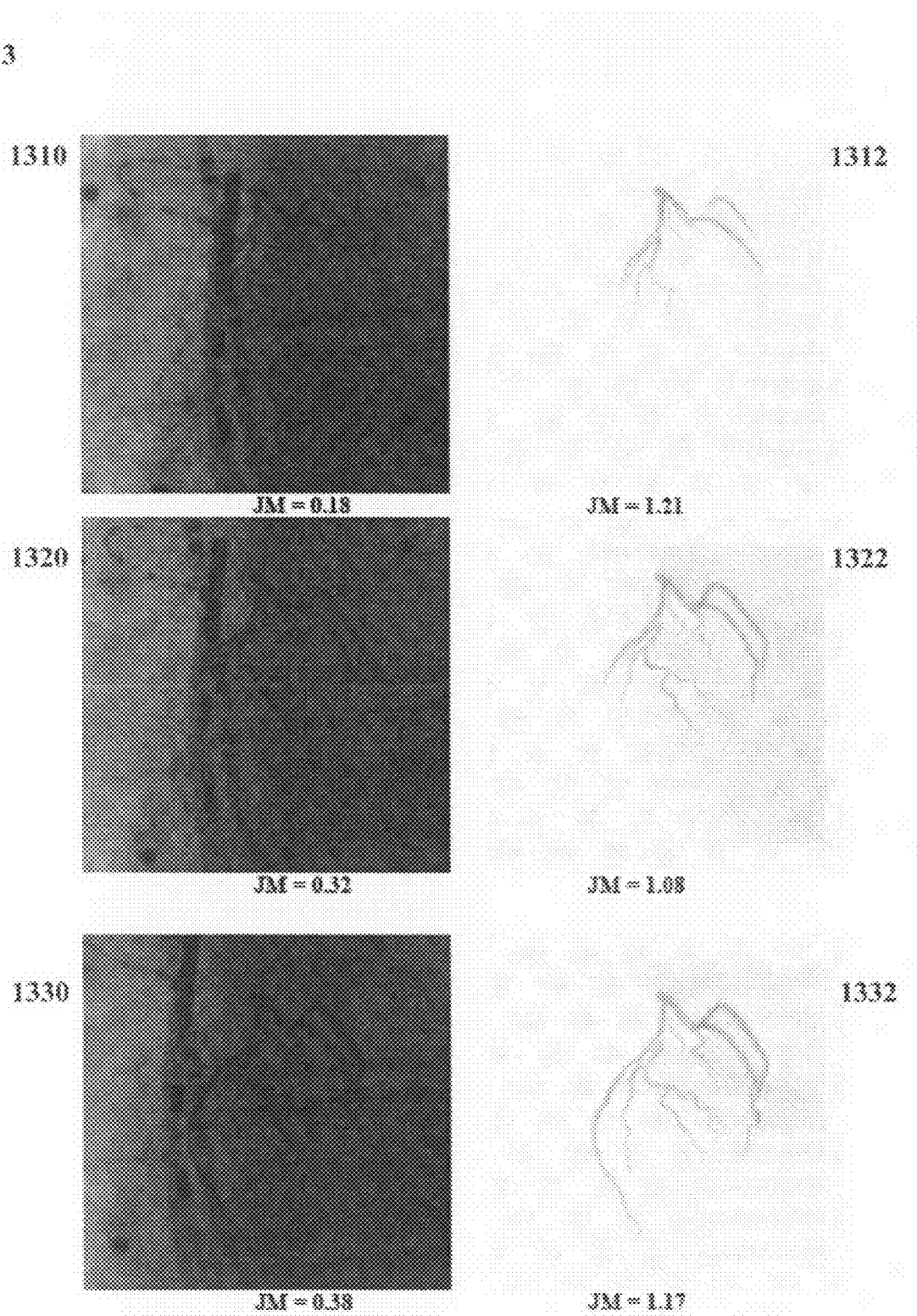
FIG. 13 illustrates exemplary segmentation results and visibility measurements for vessels segmented using coronary DSA in a synthetic fluoroscopic image sequence with no added noise.

FIG. 13 illustrates exemplary segmentation results and visibility measurements for vessels segmented using coronary DSA in a synthetic fluoroscopic image sequence with no added noise. As illustrated in FIG. 13, images 1310, 1320, and 1330 are frames of the synthetic fluoroscopic image sequence, in which the visibility of the vessels is JM=0.18, 0.32, and 0.38, respectively. Images 1312, 1322, and 1332 are segmentation results for frames 1310, 1320, and 1330, respectively. The visibility for the vessels in images 1312, 1322, and 1332 is JM=1.21, 1.08, and 1.17, respectively.

Figure 14:
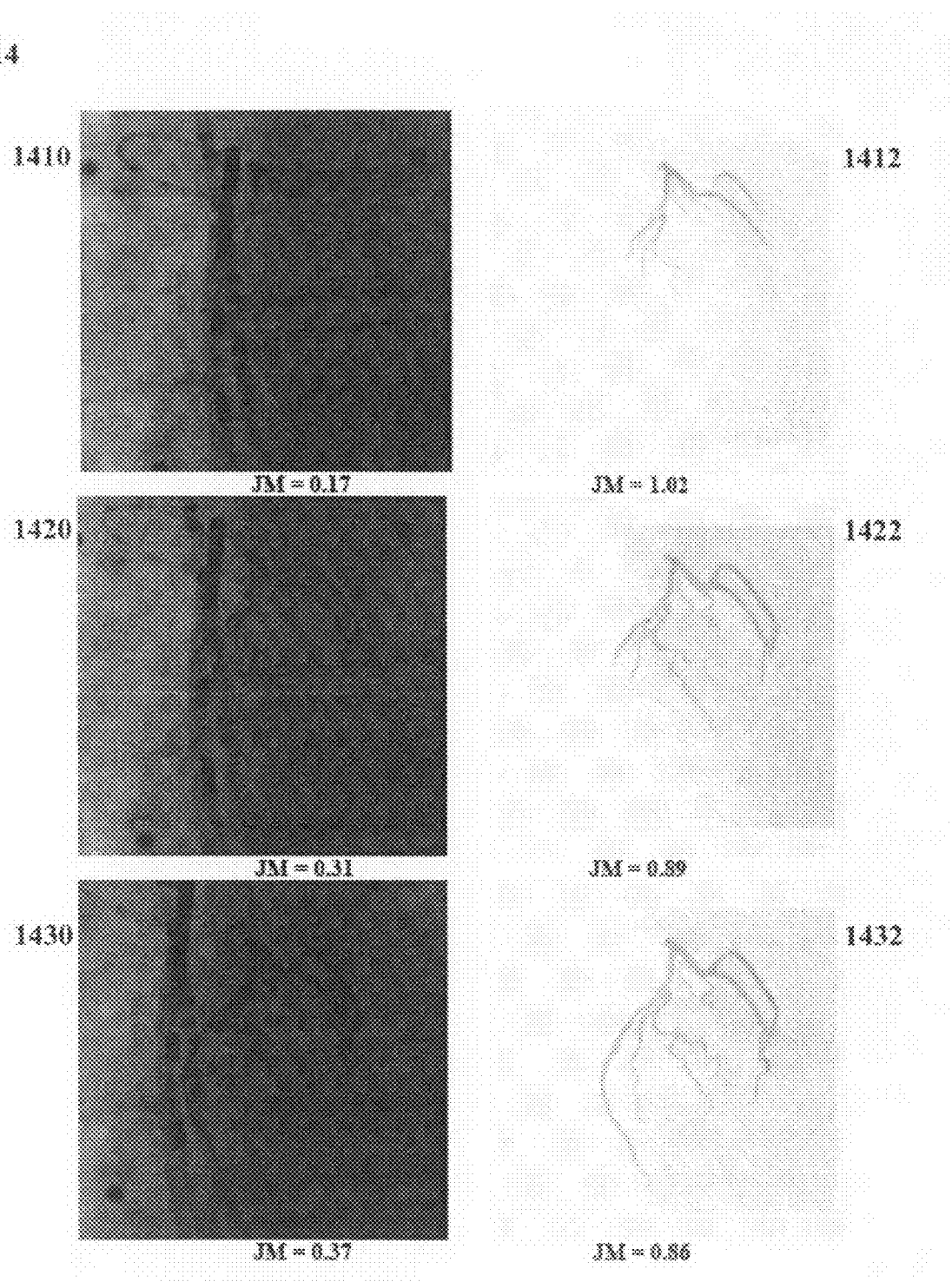
FIG. 14 illustrates exemplary segmentation results and visibility measurements for vessels segmented using coronary DSA in a synthetic fluoroscopic image sequence with moderate noise added.

FIG. 14 illustrates exemplary segmentation results and visibility measurements for vessels segmented using coronary DSA in a synthetic fluoroscopic image sequence with moderate noise added (noise scale=120). As illustrated in FIG. 14, images 1410, 1420, and 1430 are frames of the synthetic fluoroscopic image sequence with moderate noise added, in which the visibility of the vessels is JM=0.17, 0.31 and 0.37, respectively. Images 1412, 1422, and 1432 are segmentation results for frames 1410, 1420, and 1430, respectively. The visibility for the vessels in images 1412, 1422, and 1432 is JM=1.02, 0.89, and 0.86, respectively.

Figure 15:
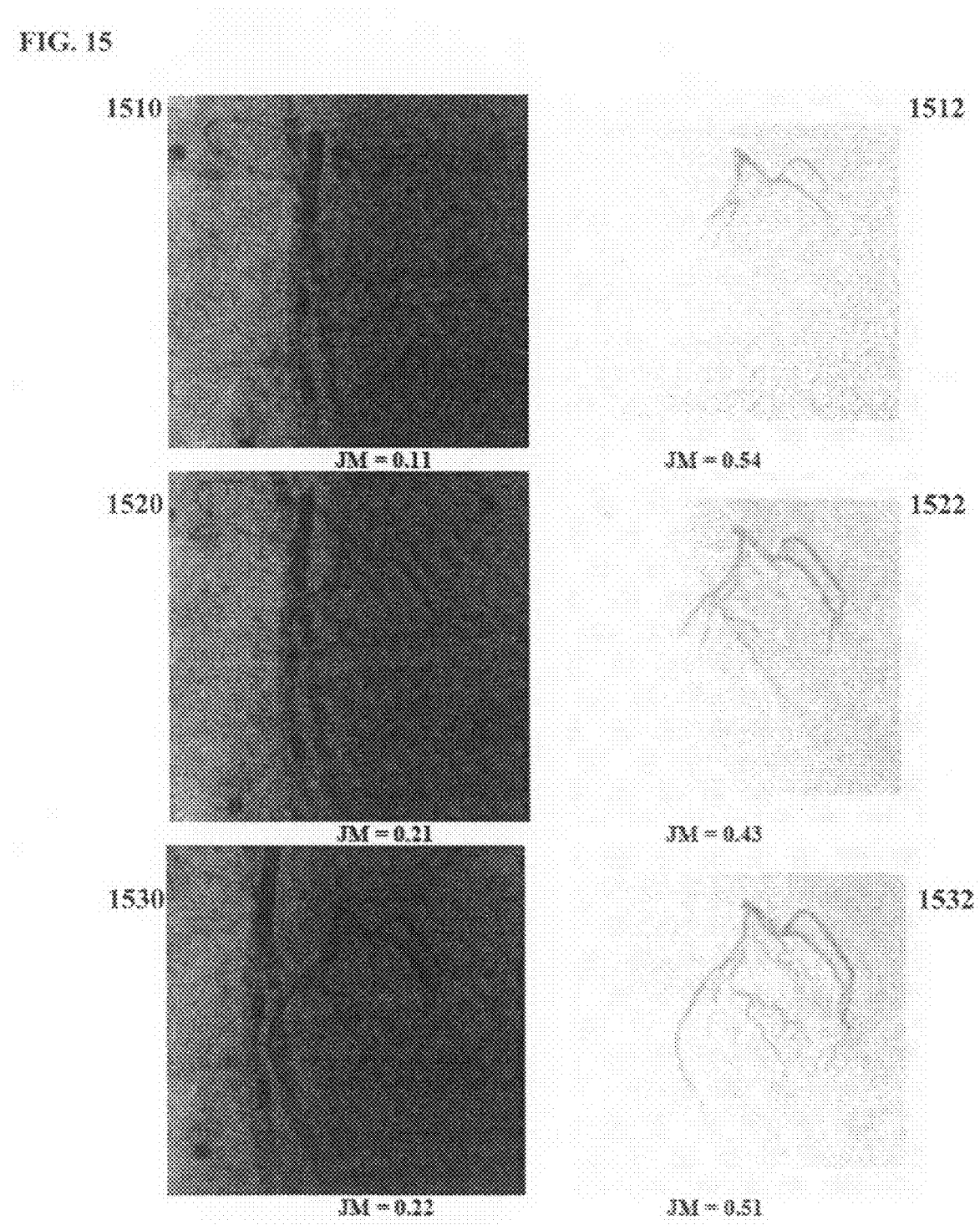
FIG. 15 illustrates exemplary segmentation results and visibility measurements for vessels segmented using coronary DSA in a synthetic fluoroscopic image sequence with severe noise added.

FIG. 15 illustrates exemplary segmentation results and visibility measurements for vessels segmented using coronary DSA in a synthetic fluoroscopic image sequence with severe noise added (noise scale=240). As illustrated in FIG. 14, images 1510, 1520, and 1530 are frames of the synthetic fluoroscopic image sequence with severe noise added, in which the visibility of the vessels is JM=0.11, 0.21 and 0.22, respectively. Images 1512, 1522, and 1532 are segmentation results for frames 1510, 1520, and 1530, respectively. The visibility for the vessels in images 1512, 1522, and 1532 is JM=0.54, 0.43, and 0.51, respectively.

Figure 16:
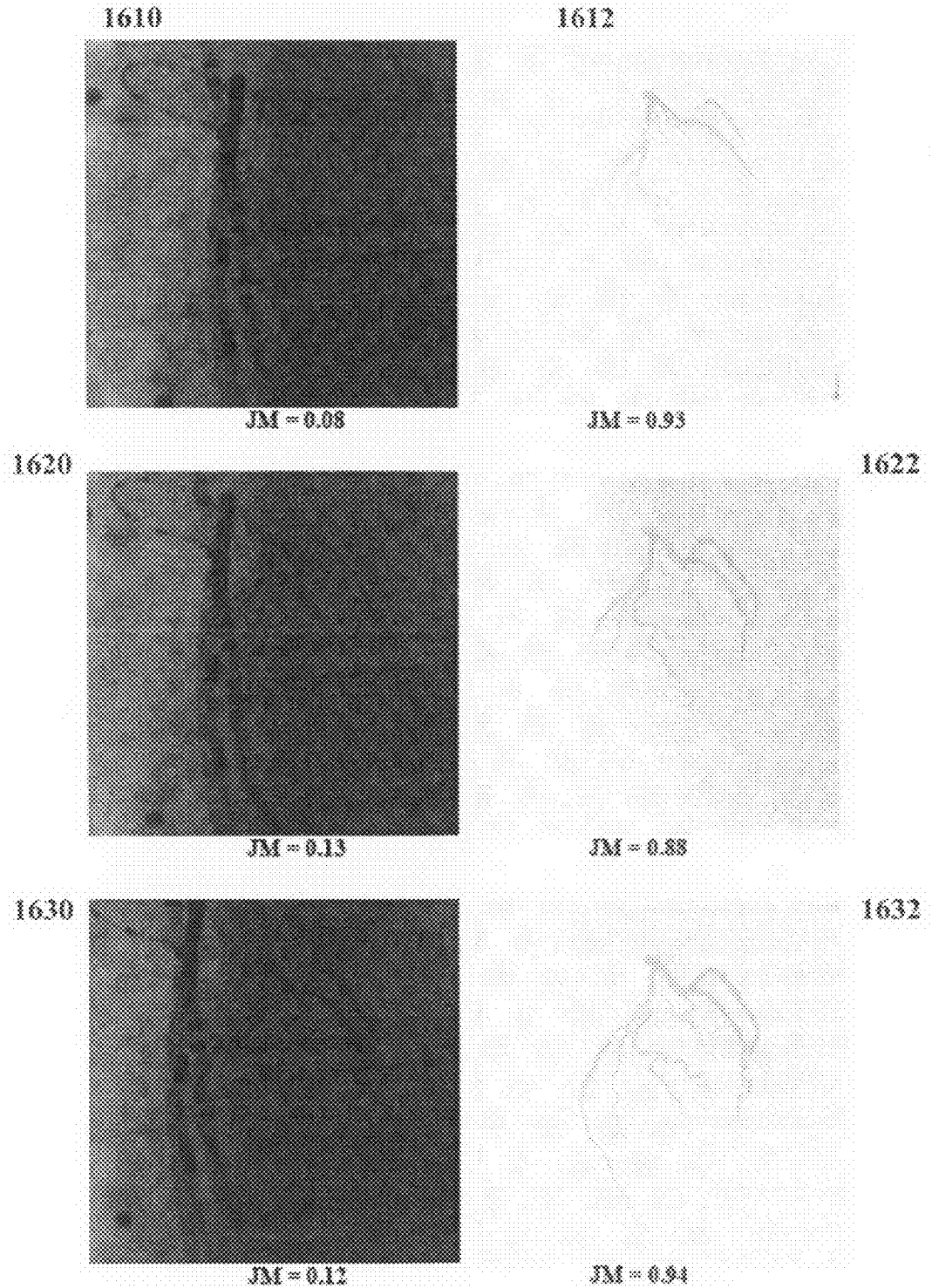
FIG. 16 illustrates exemplary segmentation results and visibility measurements for vessels segmented using coronary DSA in a synthetic fluoroscopic image sequence with low contrast.

FIG. 16 illustrates exemplary segmentation results and visibility measurements for vessels segmented using coronary DSA in a synthetic fluoroscopic image sequence with low contrast. As illustrated in FIG. 16, images 1610, 1620, and 1630 are frames of the synthetic fluoroscopic image sequence with low contrast, in which the visibility of the vessels is JM=0.08, 0.13 and 0.12, respectively. Images 1612, 1622, and 1632 are segmentation results for frames 1610, 1620, and 1630, respectively. The visibility for the vessels in images 1612, 1622, and 1632 is JM=0.93, 0.88, and 0.94, respectively.

Figure 17:
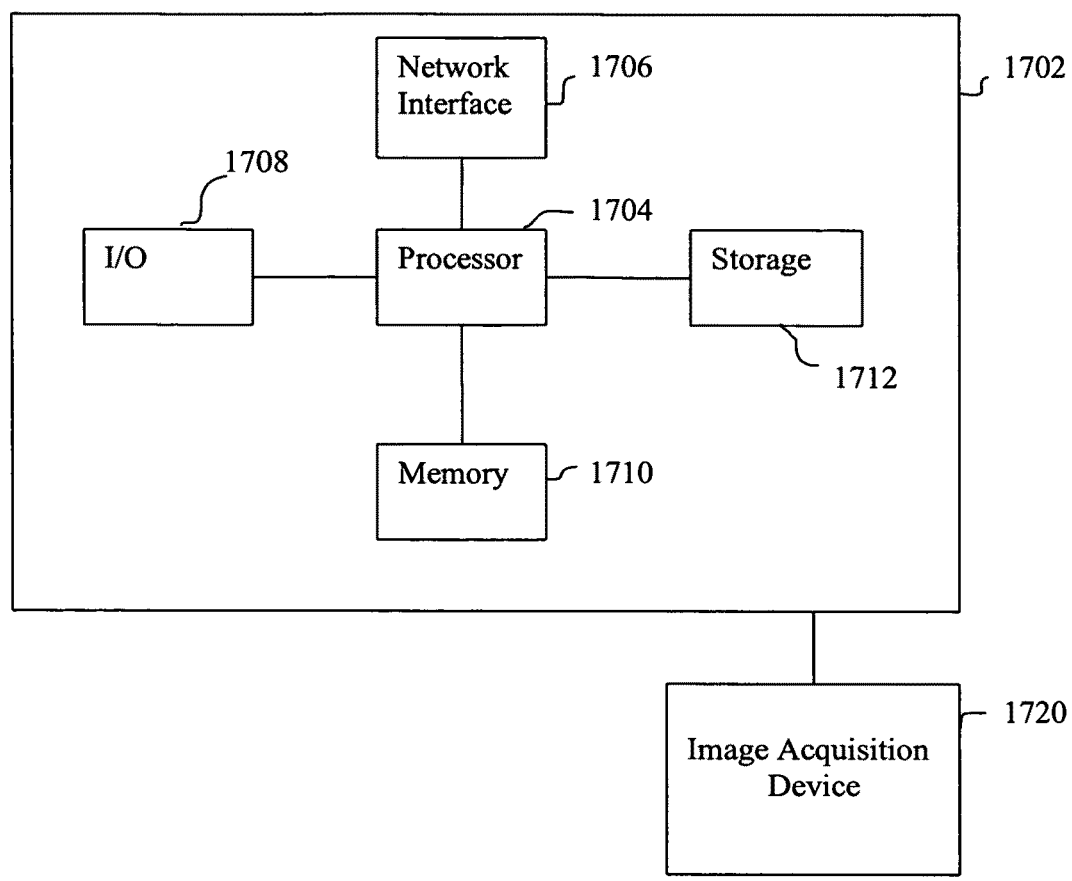
FIG. 17 is a high-level block diagram of a computer capable of implementing the present invention.

The above-described methods for evaluating an image segmentation based on visibility can be implemented on a computer using well-known computer processors, memory units, storage devices, computer software, and other components. A high-level block diagram of such a computer is illustrated in FIG. 17. Computer 1702 contains a processor 1704 which controls the overall operation of the computer 1702 by executing computer program instructions which define such operation. The computer program instructions may be stored in a storage device 1712, or other computer readable medium (e.g., magnetic disk, CD ROM, etc.), and loaded into memory 1710 when execution of the computer program instructions is desired. Thus, the method steps of FIGS. 1 and 4 can be defined by the computer program instructions stored in the memory 1710 and/or storage 1712 and controlled by the processor 1704 executing the computer program instructions. An image acquisition device 1720, such as an X-ray imaging device, can be connected to the computer 1702 to input digital images to the computer 1702. It is possible to implement the image acquisition device 1720 and the computer 1702 as one device. It is also possible that the image acquisition device 1720 and the computer 1702 communicate wirelessly through a network. The computer 1702 also includes one or more network interfaces 1706 for communicating with other devices via a network. The computer 1702 also includes input/output devices 1708 that enable user interaction with the computer 1702 (e.g., display, keyboard, mouse, speakers, buttons, etc.) One skilled in the art will recognize that an implementation of an actual computer could contain other components as well, and that FIG. 17 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for evaluating an image segmentation technique, comprising:
   generating synthetic image data by
      generating a ground truth image of an object to be segmented, and
      combining the ground truth image with a background image resulting in a synthetic image;
   segmenting the synthetic image data to extract the object using the segmentation technique, resulting in a foreground containing the extracted object and a background; and
   quantitatively measuring a visibility of the extracted object based on intensity distributions of the segmented foreground and background.

2. The method of claim 1, wherein said step of generating a ground truth image comprises:
   generating a ground truth image based on human annotations.

3. The method of claim 1, wherein said step of generating synthetic image data further comprises:
   adding noise to the synthetic image to simulate a certain noise levels.

4. The method of claim 3, wherein said step of adding noise to the synthetic image comprises:
   generating a uniformly distributed white noise image;
   blurring the noise image with a Gaussian filter; and multiplying the noise image by a noise scale to obtain the certain noise level; and adding the noise image to the synthetic image.

5. The method of claim 1, wherein the synthetic image data is synthetic fluoroscopic image sequence, and said step of segmenting the synthetic image data to extract an object using the segmentation technique comprises:

segmenting the synthetic fluoroscopic image sequence to extract vessels using coronary digital subtraction angiography (DSA).

6. The method of claim 1, wherein said step of generating synthetic image data comprises:

generating a sequence of ground truth images of vessels from a fluoroscopic image sequence; and summing the sequence of ground truth images with a sequence of background x-ray images in logarithm space to simulate the composition of x-ray images, resulting in a synthetic fluoroscopic image sequence.

7. The method of claim 6, wherein said step of segmenting the synthetic image data to extract an object using the segmentation technique comprises:

estimating motion fields of vessel branches between frames of the synthetic fluoroscopic image sequence;

segmenting a vessel layer and a background layer based on the estimated motion fields; and normalizing the extracted vessel layers.

8. The method of claim 7, wherein said step of estimating motion fields of vessel branches between frames of the synthetic fluoroscopic image sequence comprises:

separating the vessel branches into a plurality of sets;

tracking the vessel braches in each set to estimated the motion fields.

9. The method of claim 8, wherein said step of segmenting a vessel layer and a background layer based on the estimated motion fields comprises:

segmenting a plurality of vessel layers corresponding to the plurality of sets of vessel branches; and combining the plurality of vessel layers to generate a single foreground layer.

10. The method of claim 1, wherein said step of quantitatively measuring a visibility of the extracted object based on intensity distributions of the segmented foreground and background comprises:

calculating a Jeffries-Matusita (JM) distance between the intensity distributions of the segmented foreground and background.

11. The method of claim 1, further comprising:

comparing the quantitatively measured visibility of the extracted object with a qualitatively measured visibility of the object in the synthetic image data.

12. An apparatus for evaluating an image segmentation technique, comprising:

means for generating synthetic image data comprising:
means for generating a ground truth image of an object to be segmented, and
means for combining the ground truth image with a background image resulting in a synthetic image;

means for segmenting the synthetic image data to extract an object using the segmentation technique, resulting in a foreground containing the extracted object and a background; and means for quantitatively measuring a visibility of the extracted object based on intensity distributions of the segmented foreground and background.

13. The apparatus of claim 12, wherein said means for generating synthetic image data further comprises:

means for adding noise to the synthetic image to simulate a certain noise levels.

14. The apparatus of claim 12, wherein said means for generating synthetic image data comprises:

means for generating a sequence of ground truth images of vessels from a fluoroscopic image sequence; and means for summing the sequence of ground truth images with a sequence of background x-ray images in logarithm space to simulate the composition of x-ray images, resulting in a synthetic fluoroscopic image sequence.

15. The apparatus of claim 14, wherein said means for segmenting the synthetic image data to extract an object using the segmentation technique comprises:

means for estimating motion fields of vessel branches between frames of the synthetic fluoroscopic image sequence;

means for segmenting a vessel layer and a background layer based on the estimated motion fields; and means for normalizing the extracted vessel layers.

16. The apparatus of claim 12, wherein said means for quantitatively measuring a visibility of the extracted object based on intensity distributions of the segmented foreground and background comprises:

means for calculating a Jeffries-Matusita (JM) distance between the intensity distributions of the segmented foreground and background.

17. The apparatus of claim 12, further comprising:

means for comparing the quantitatively measured visibility of the extracted object with a qualitatively measured visibility of the object in the synthetic image data.

18. A non-transitory computer readable medium encoded with computer executable instructions for evaluating an image segmentation technique, the computer executable instructions defining steps comprising:

generating synthetic image data by:
generating a ground truth image of an object to be segmented, and
combining the ground truth image with a background image resulting in a synthetic image;

segmenting the synthetic image data to extract an object using the segmentation technique, resulting in a foreground containing the extracted object and a background; and quantitatively measuring a visibility of the extracted object based on intensity distributions of the segmented foreground and background.

19. The non-transitory computer readable medium of claim 18, wherein the computer executable instructions defining the step of generating synthetic image data further comprise computer executable instructions defining the step of:

adding noise to the synthetic image to simulate a certain noise levels.

20. The non-transitory computer readable medium of claim 18, wherein said the computer executable instructions defining the step of generating synthetic image data comprise computer executable instructions defining the steps of:

generating a sequence of ground truth images of vessels from a fluoroscopic image sequence; and summing the sequence of ground truth images with a sequence of background x-ray images in logarithm space to simulate the composition of x-ray images, resulting in a synthetic fluoroscopic image sequence.

21. The non-transitory computer readable medium of claim 20, wherein the computer executable instructions defining the step of segmenting the synthetic image data to extract an object using the segmentation technique comprise computer executable instructions defining the steps of:

estimating motion fields of vessel branches between frames of the synthetic fluoroscopic image sequence;

segmenting a vessel layer and a background layer based on the estimated motion fields; and normalizing the extracted vessel layers.

22. The non-transitory computer readable medium of claim 18, wherein the computer executable instructions defining the step of quantitatively measuring a visibility of the extracted object based on intensity distributions of the segmented foreground and background comprise computer executable instructions defining the step of:

calculating a Jeffries-Matusita (JM) distance between the intensity distributions of the segmented foreground and background.

23. The non-transitory computer readable medium of claim 18, further comprising computer executable instructions defining the step of:

comparing the quantitatively measured visibility of the extracted object with a qualitatively measured visibility of the object in the synthetic image data.

* * * * *